(12) United States Patent
Kister et al.

(10) Patent No.: US 12,533,954 B2
(45) Date of Patent: Jan. 27, 2026

(54) BENDABLE GLASS ARTICLE FOR VEHICLE INTERIOR SYSTEM

(71) Applicant: CORNING INCORPORATED, Corning, NY (US)

(72) Inventors: Evan Gray Kister, Painted Post, NY (US); David Evan Robinson, Corning, NY (US); Jason Scott Stewart, Hornell, NY (US)

(73) Assignee: CORNING INCORPORATED, Corning, NY (US)

( * ) Notice: Subject to any disclaimer, the term of this patent is extended or adjusted under 35 U.S.C. 154(b) by 474 days.

(21) Appl. No.: 17/928,726

(22) PCT Filed: May 27, 2021

(86) PCT No.: PCT/US2021/034389
§ 371 (c)(1),
(2) Date: Nov. 30, 2022

(87) PCT Pub. No.: WO2021/247343
PCT Pub. Date: Dec. 9, 2021

(65) Prior Publication Data
US 2023/0278423 A1 Sep. 7, 2023

Related U.S. Application Data

(60) Provisional application No. 63/034,436, filed on Jun. 4, 2020.

(51) Int. Cl.
*B60K 35/60* (2024.01)
*B29C 45/14* (2006.01)
(Continued)

(52) U.S. Cl.
CPC ........ *B60K 35/60* (2024.01); *B29C 45/14434* (2013.01); *B60K 35/22* (2024.01);
(Continued)

(58) Field of Classification Search
CPC ...... B60K 35/00; B60K 35/22; B60K 35/223; B60K 35/50; B60K 35/60; B60K 35/70;
(Continued)

(56) References Cited

U.S. PATENT DOCUMENTS 10,175,802 B2 * 1/2019 Boggs ................. B32B 7/12
10,781,127 B2 * 9/2020 Kumar ................ B60K 35/10
(Continued)

FOREIGN PATENT DOCUMENTS

CN 109246963 A * 1/2019 ........... C03B 23/203
DE 102016213688 A1 2/2018
(Continued)

OTHER PUBLICATIONS

International Search Report and Written Opinion of the International Searching Authority; PCT/US2021/034389; dated Sep. 17, 2021; 7 pages; European Patent Office.

*Primary Examiner* — Amy R Weisberg
*Assistant Examiner* — Denise Lynne Esquivel
(74) *Attorney, Agent, or Firm* — Daniel J. Greenhalgh

(57) ABSTRACT

A glass article for a vehicle interior system (10). The glass article includes a glass sheet having first and second major surfaces with a minor surface connecting the first and second major surfaces. The glass sheet has a first side and a second side. A hinge is disposed on the second major surface of the glass sheet. The hinge divides the glass sheet between the first side and the second side. An encapsulating material is molded at least partially around the minor surface and at least partially over the second major surface. The second side of the glass sheet rotates about the hinge from a first configuration to a second configuration. In the first configuration, the first side forms a first angle with the second side, and in the second configuration, the first side forms a second angle, different from the first angle, with the second side.

20 Claims, 3 Drawing Sheets

(51) Int. Cl.
   *B60K 35/22* (2024.01)
   *B60K 37/20* (2024.01)
   *B62D 25/14* (2006.01)
   *B29K 27/06* (2006.01)
   *B29K 75/00* (2006.01)
   *B29K 709/08* (2006.01)
   *B29L 31/30* (2006.01)

(52) U.S. Cl.
   CPC .............. *B60K 37/20* (2024.01); *B62D 25/14* (2013.01); *B29K 2027/06* (2013.01); *B29K 2075/00* (2013.01); *B29K 2709/08* (2013.01); *B29L 2031/3008* (2013.01)

(58) Field of Classification Search
   CPC .... B60K 2360/65; B60K 37/20; B62D 25/14; B29C 45/14434; B29C 41/20; B29C 41/30; B29C 45/14; B29C 45/14819; B29K 2027/06; B29K 2075/00; B29K 2709/08; B29L 2031/3008

USPC .................. 296/70, 193.09; 264/279, 279.1
See application file for complete search history.

(56) References Cited

U.S. PATENT DOCUMENTS

| | | |
|---|---|---|
| 2008/0057260 A1 | 3/2008 | Buchhauser et al. |
| 2015/0062927 A1 | 3/2015 | Hirakata et al. |
| 2017/0060188 A1* | 3/2017 | Han ....................... G06F 1/1641 |
| 2017/0263690 A1* | 9/2017 | Lee ........................ H10D 86/60 |
| 2018/0050948 A1* | 2/2018 | Faik ...................... B60K 35/00 |
| 2022/0105802 A1* | 4/2022 | Jeong ..................... B60R 16/02 |

FOREIGN PATENT DOCUMENTS

| | | | |
|---|---|---|---|
| EP | 3428770 A1 | 1/2019 | |
| JP | 2013-188993 A | 9/2013 | |
| KR | 10-2019-0001864 A | 1/2019 | |
| WO | 99/34348 A1 | 7/1999 | |
| WO | WO-2020236457 A1 * | 11/2020 | ............. B32B 17/06 |

* cited by examiner ns systems. In the method, a glass sheet is arranged in a mold. The glass sheet
BENDABLE GLASS ARTICLE FOR VEHICLE INTERIOR SYSTEM

CROSS-REFERENCE TO RELATED APPLICATIONS

This application claims the benefit of priority under 35 U.S.C. § 371 of International Application No. PCT/US2021/034389, filed on May 27, 2021, which claims the benefit of priority under 35 U.S.C. § 119 of U.S. Provisional Application Ser. No. 63/034,436 filed on Jun. 4, 2020, the content of which are relied upon and incorporated herein by reference in their entirety.

BACKGROUND

The disclosure relates to glass articles and methods for forming same, and more particularly to a bendable glass article for a vehicle interior system and a method of forming such glass articles using an encapsulating material.

Vehicle interiors include a variety of display screens. Efforts have been made to incorporate such display screens into the overall aesthetic design of the vehicle. In this way, attempts have been made to incorporate the displays into continuous surfaces, e.g., of a dashboard. Further, in order to enhance both the aesthetic design and functionality, glass has been used to form these continuous surfaces. However, the use of the glass provides additional design challenges over other conventional plastic, metal, and composite materials, which have had significant time to develop in the automotive industry.

SUMMARY

According to an aspect, embodiments of the disclosure relate to a glass article for a vehicle interior system. The glass article includes a glass sheet having a first major surface, a second major surface opposite the first major surface, and a minor surface connecting the first major surface and the second major surface. The glass sheet has a first side and a second side. Also included is at least one hinge disposed on the second major surface of the glass sheet. The at least one hinge dividing the glass sheet between the first side and the second side. The glass article further includes an encapsulating material molded at least partially around the minor surface and at least partially over the second major surface. The second side of the glass sheet rotates about the at least one hinge from a first configuration to a second configuration. In the first configuration, the first side forms a first angle with the second side, and in the second configuration, the first side forms a second angle with the second side. The first angle is different from the second angle.

According to another aspect, embodiments of the disclosure relate to an interior system of a vehicle. The interior system includes a dashboard base positioned across a center line axis of the vehicle. The center line axis divides the vehicle longitudinally into a driver side and a passenger side. The interior system also includes a glass article attached to the dashboard base. The glass article includes a glass sheet having a first major surface, a second major surface opposite to the first major surface, and a minor surface connecting the first major surface and the second major surface. The first glass sheet has a first side and a second side. The first side is located on the driver side of the center line axis. At least one hinge is disposed on the second major surface of the glass sheet. The at least one hinge divides the glass sheet between the first side and the second side. An encapsulating material is molded at least partially around the minor surface and at least partially over the second major surface. The second side of the glass sheet rotates about the hinge from a first configuration to a second configuration. In the first configuration, the first side of the glass sheet includes a first portion on the driver side and a second portion on the passenger side. In the second configuration, the first portion of the first side of the glass sheet is increased relative to the first configuration, and the second portion of the first side of the glass sheet is decreased relative to the first configuration.

According to still another aspect, embodiments of the disclosure relate to a method of forming a glass article. In the method, a glass sheet is arranged in a mold. The glass sheet has a first major surface, a second major surface opposite the first major surface, and a minor surface connecting the first major surface and the second major surface. At least one hinge is positioned on the second major surface of the glass sheet in the mold. An encapsulating material is injected into the mold so that the encapsulating material at least partially surrounds the minor surface and at least partially covers the second major surface of the glass sheet. The glass article is configured to bend about the at least one hinge from a first configuration to a second configuration. In the first configuration, the first side forms a first angle with the second side, and in the second configuration, the first side forms a second angle with the second side. The first angle is different from the second angle.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION

Embodiments of the present disclosure relate to a bendable glass article of a vehicle interior system. In embodiments, the glass article is configured to incorporate multiple display screens that might be found on a dashboard of a vehicle, such as an infotainment screen, an instrument panel, and a vehicle perimeter camera. In the presently disclosed glass article, a first display screen is configured to bend between a position in which it is oriented substantially equally between a driver side and a passenger side of a vehicle to a position in which it is oriented toward the driver side. In this way, the screen can be oriented toward the driver of a vehicle who is traveling alone or when lighting conditions impede the driver's vision of the display. The glass article is formed using an encapsulating material that provides edge protection for the glass sheet. The encapsulating material also provides a convenient way to incorporate a hinge into the glass article to provide the aforementioned bending.

Embodiments of the glass article disclosed herein provide a customizable design in which the properties of the various glass article components can be tailored to meet relevant head impact testing (HIT) performance requirements. In particular, the glass articles formed using an encapsulating material allow for tuning of the rotational and translational stiffness of the glass article, which are directly related to HIT performance. These and other aspects and advantages will be described in relation to the embodiments discussed below and shown in the figures. These embodiments are presented by way of illustration and not by way of limitation.

Figure 1:
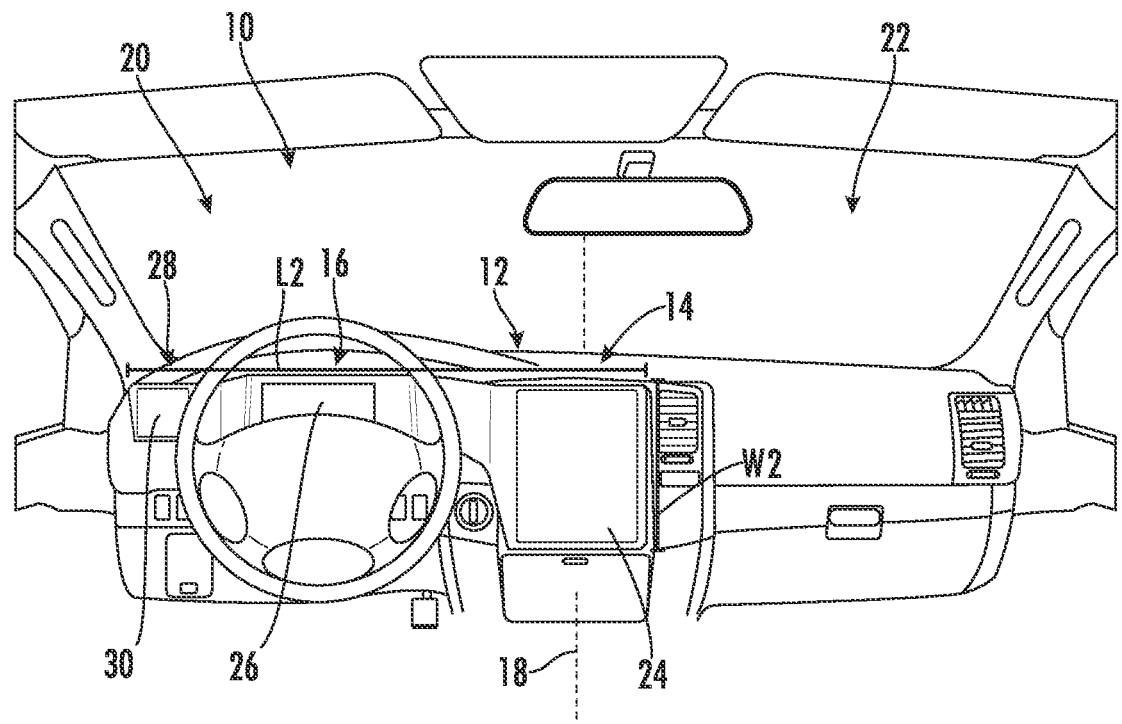
FIG. 1 depicts a vehicle interior including a glass article with a living hinge integrated into a dashboard of the vehicle, according to exemplary embodiments.

FIG. 1 depicts a vehicle interior 10, including a dashboard base 12. In embodiments, the dashboard base 12 includes a center console region 14 and an instrument panel region 16. In general, the dashboard base 12 is disposed across a center line axis 18 of the vehicle. The center line axis 18 divides the vehicle longitudinally between a driver side 20 and a passenger side 22. The instrument panel region 16 is on the driver side 20 of the centerline axis 18, and the center console region 14 may extend across the center line 18 such that the center console region 14 is on both the driver side 20 and the passenger side 22. In embodiments, the center console region 14 includes a first display screen 24, and the instrument panel region 16 includes a second display screen 26. In embodiments, the dashboard base 12 may include one or more additional display regions 28, each including an additional display screen 30.

In embodiments, the first display screen 24 of the center console region 14 is an infotainment center providing information and a control panel to a driver and/or passenger of the vehicle. For example, the first display screen 24 may display vehicle information, GPS directions, climate controls, audio controls, etc. In embodiments, the first display screen 24 may be configured as a touch screen. In embodiments, the second display screen 26 of the instrument panel region 16 may display a speedometer, a fuel gage, a tachometer, a coolant temperature, etc. In embodiments including an additional display screen 30, the additional display screen 30 may display, e.g., views of a front of the vehicle, a rear of the vehicle, or one or more blindspots of the vehicle as captured by a remote camera.

The first display screen 24, the second display screen 26, and the additional display screen 30 (when included) are all incorporated in the same curved glass article 32. As will be discussed below, the second display screen 26 (and additional screen 30) is fixed to the instrument panel region 14 of the dashboard 12, and the first display screen 24 in the center console region 14 is bendable relative to the second display screen 26. In embodiments, the first display screen 24 bends from a first position in which the first display screen 24 is oriented substantially equally between the driver side 20 and the passenger side 22 to a second position in which the first display screen 24 is oriented towards the driver side 20. In order to allow for bending, the glass article 32 has a free end on the first display screen 24 side. According to the present disclosure, at least this free end is encapsulated with an encapsulating material in order to protect the free end from edge stresses that may serve as fracture sites of the glass article 32.

Figure 2:
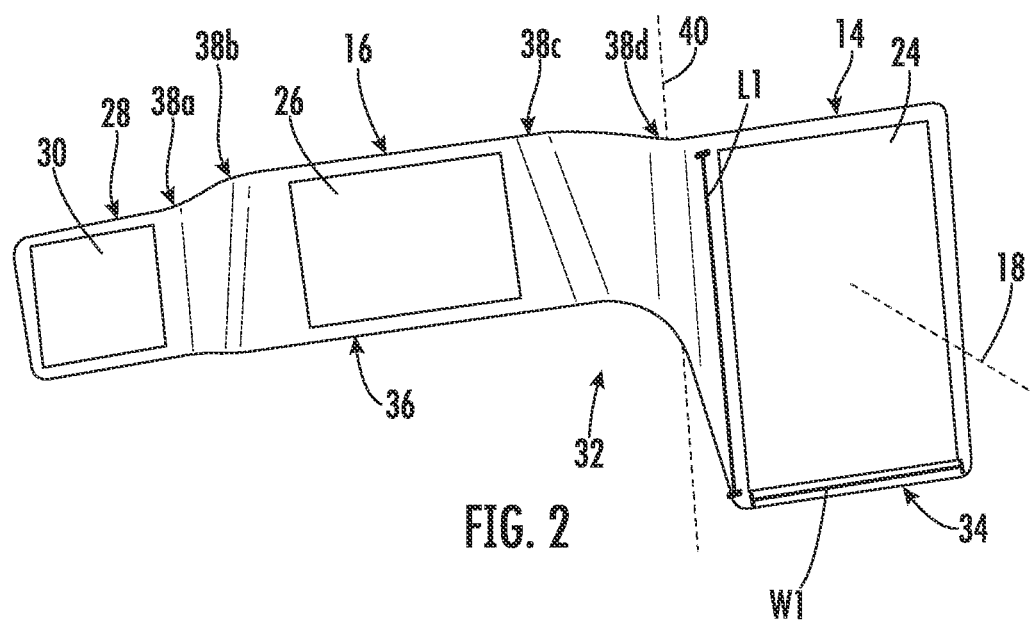
FIG. 2 depicts the glass article of FIG. 1, according to an exemplary embodiment.

FIG. 2 depicts the glass article 32, including the first display screen 24, second display screen 26, and the additional display screen 30. The first display screen 30 is provided on a first side 34 of the glass article 32, and the second display screen 26 and the additional display screen 30 are provided on a second side 36 of the glass article 32. As depicted in the embodiment of FIG. 2, the second side 36 of the glass article 32 may include one or more curvatures 38a-d. As shown, the second display screen 26 is disposed behind the first display screen 24 and the additional display screen 30. In this context, "behind" means that the second display screen 26 is in a plane positioned farther from the driver than the planes in which the first display screen 24 and the additional display screen 30 are located. In embodiments, the first display screen 24 and the additional display screen 30 may be located in the same plane, and in other embodiments, the first display screen 24 and the additional display screen 30 may be located in different planed. Further, in embodiments, each plane in which the display screens 24, 26, 30 are located may be parallel to none of the other planes, one of the other planes, or both of the other planes. To achieve the positioning shown in FIG. 2, the glass article 32 includes a first convex curvature 38a and a second concave curvature 38b between the additional display screen 30 and the second display screen 26. Further, the glass article includes a third concave curvature 38c and a fourth convex curvature 38d between the second display screen 26 and the first display screen 24.

As mentioned, the second side 36 of the glass article 32 is fixed to the dashboard base 12, and the first side 34 of the glass article 32 is bendable about a bending axis 40 relative to the second side 36 of the glass article 32. In embodiments, the fourth convex curvature 38d is formed on the bending axis 40. In this way, the first side 34 is bendable such that the fourth convex curvature 38d is variable and, in particular, can be removed from the glass article 32. That is, the first side 34 of the glass article 32 can be bent so that the glass article 32 is substantially planar between the third concave curvature 38c and the first side 34 of the glass article 32.

In embodiments, at least a portion of the second side 36 of the glass article 32 forms an angle of about 180° (i.e., substantially planar) with the first side 34 in the configuration where the first display screen 24 is oriented towards the driver side 20. In embodiments at least a portion of the second side 36 forms an angle of 190° to 290° with the first side 34 in a configuration in which the first display screen is oriented between the driver side 20 and the passenger side 22.

Further, in embodiments, the first screen 24 includes a length dimension L1 and a width dimension W1. In embodiments, at least one of the length dimension L1 or the width dimension W1 is perpendicular to the center line axis 18 in the bent configuration, and in the planar configuration, at least one of the length dimension L1 or the width dimension W1 that is perpendicular to the center line axis 18 in the bent configuration becomes transverse to the center line axis 18 in the planar configuration. For example, as shown in FIG. 2, the width dimension W1 is substantially perpendicular to the center line axis 18 in the bent configuration, and when the first side 34 is rotated to the planar configuration, the width dimension W1 will become transverse to the center line axis 18.

Additionally, in embodiments, when in the bent configuration, the first side 34 of the glass article 32 has a first portion on the driver side 20 of the center line axis 18 and a second portion on the passenger side 22 of the center line axis 18. When the first side 34 is rotated to the planar configuration, the first portion of the first side 34 of the glass article 32 on the driver side 20 will increase, and the second portion of the first side 34 of the glass article 32 on the passenger side 22 will decrease. That is, the first side 34 will be oriented towards the driver side 20 when in the planar configuration.

Figure 3:
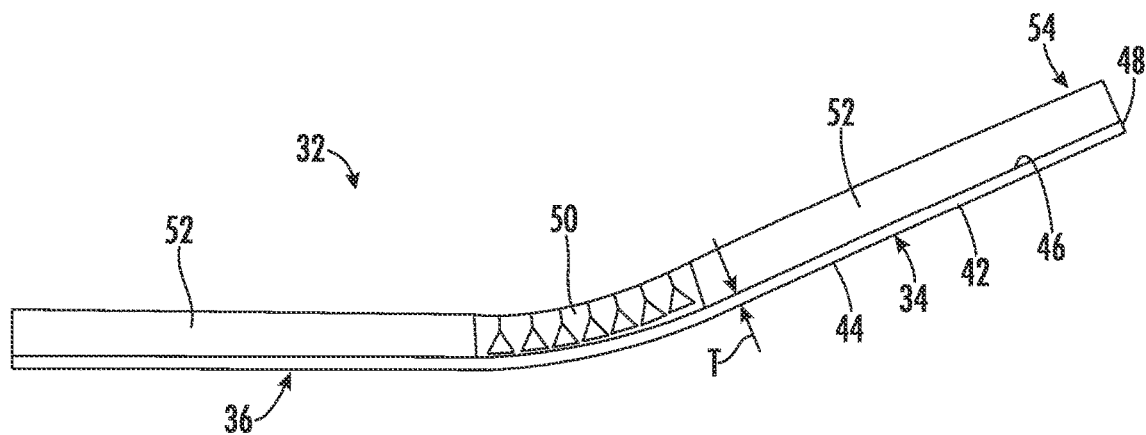
FIG. 3 depicts a side view of a simplified glass article having a living hinge, according to an exemplary embodiment.

FIG. 3 depicts a simplified, schematic side view of the glass article 32 showing the region of the bend axis 40. As can be seen, the glass article 32 includes a glass sheet 42 having a first major surface 44 and a second major surface 46. The second major surface 46 is opposite to the first major surface 44, and a thickness T (average thickness or maximum thickness) is defined between the first major surface 44 and the second major surface 46. In embodiments, the thickness is, on average, from 0.3 mm to 2.0 mm, in particular from 0.4 mm to 1.1 mm. A minor surface 48 extends around the perimeter of the glass sheet 42 and connects the first major surface 44 and the second major surface 46.

Disposed on the second major surface 46 is at least one hinge 50. In embodiments, the hinge 50 divides the glass sheet 42 between the first side 34 and the second side 36 and allows for the first side 34 to bend relative to the second side 36 of the glass article 32. In embodiments, the hinge 50 is positionable such that the first side 34 can be put at any angle between maximum travel positions of the first side 34 (i.e., between the planar configuration oriented toward the driver side and the bent configuration oriented equally between the driver side and the passenger side). Further, in embodiments, the hinge 50 is manually actuatable, i.e., a user can position the first side 34 of the glass article 32 by hand. In other embodiments, the hinge 50 is electro-mechanically actuatable such that the first side 34 is positioned by an actuator activated, e.g., by a touch feature, voice command, or push button, by the user. The hinge 50 can be any of a variety of hinges suitable to provide a bending axis 40, such as a living hinge, a mandrel hinge, a flexure hinge, a lattice hinge, or a links hinge, among others. In embodiments, the hinge 50 is a single hinge. In embodiments, the single hinge 50 extends from 10% up to an entire length of the bending axis 40 between the first side 34 and the second side 36. In other embodiments, at least two hinges 50 are provided along the bending axis 40 between the first side 34 and the second side 36. In such embodiments, the hinges 50 may be equidistantly spaced along the bending axis 40.

An encapsulating material 52 is molded onto a least a portion of the second major surface 46 of the glass sheet 42. As mentioned above, the encapsulating material 52 supports and protects the glass sheet 42. In particular, the encapsulating material 52 protects the glass sheet 42 from edge stresses at a free end 54 of the glass sheet 42. Further, in embodiments, the encapsulating material 52 covers not only a portion of the second major surface 46 but also at least a portion of the minor surface 48. In still other embodiments, the encapsulating material 52 may cover a portion of the first major surface 44 of the glass sheet 42. In embodiments, the encapsulating material 52 also bonds the hinge 50 to the second major surface 46 of the glass sheet 42. In other embodiments, the hinge 50 is not bonded to the second major surface 46 of the glass sheet 42 but may be held in place by the encapsulating material 52. In still other embodiments, the hinge 50 may be bonded to the second major surface 46 of the glass sheet 42 with an adhesive and also bonded to the encapsulating material 52.

In embodiments, the encapsulating material 52 comprises, e.g., polyurethane, polyvinylchloride, and reaction injection molding materials, among others. As used herein, "reaction injection molding materials" include thermosetting polymers that cure within a mold during an injection molding procedure. In embodiments, reaction injection molding materials include polyurethane, polyureas, polyisocyanurates, polyesters, polyphenols, polyepoxides, and nylon 6. In embodiments, the encapsulating material 52 may include reinforcing agents, such as glass fiber or mica.

Figure 4:
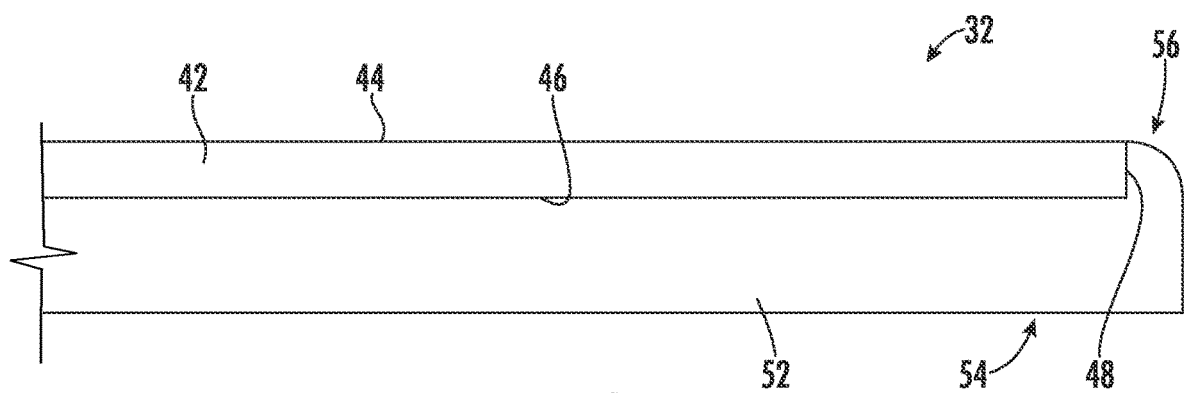
FIG. 4 depicts an encapsulated free end of a glass article, according to an exemplary embodiment.
Figure 5:
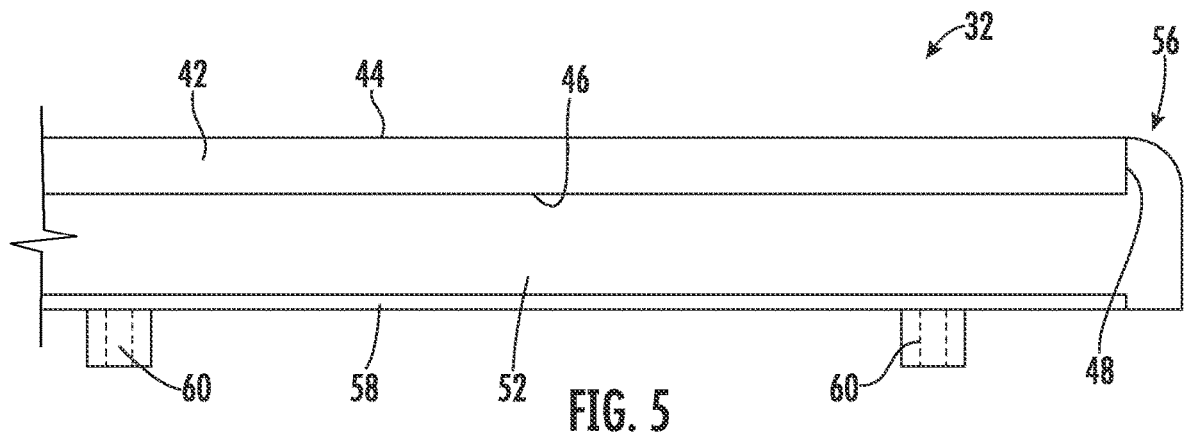
FIG. 5 depicts an encapsulated free end of a glass article including a support member, according to an exemplary embodiment.
Figure 6:
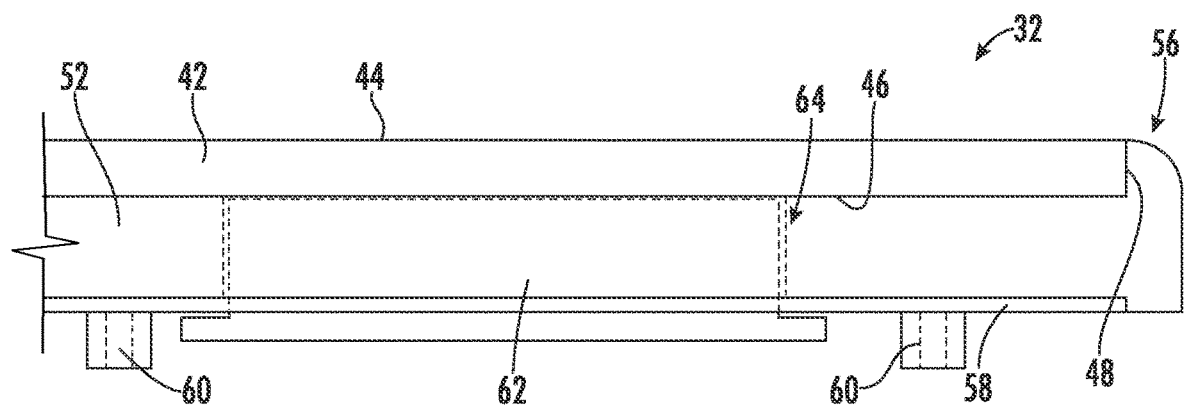
FIG. 6 depicts an encapsulated free end of a glass article including a support member and display, according to an exemplary embodiment.

FIGS. 4-6 depict various embodiments of the glass article 32 including the encapsulating material 52 molded onto the glass sheet 42. Referring first to FIG. 4, the glass article 32 is shown with the encapsulating material 52 disposed on the second major surface 46 and minor surface 48 of the glass sheet 42. As can be seen, the encapsulating material 52 is not provided on the first major surface 44, and a rounded edge 56 is molded in the encapsulating material 52 to provide a smooth transition around the free end 54 of the glass sheet 42, tapering from the level of the first major surface 44.

FIG. 5 depicts another embodiment of the glass article 32 that includes a support member 58. In particular, the support member 58 is integrated into the glass article 32 by injecting encapsulating material between the second major surface 46 of the glass sheet 42 and the support member 58. The support member 58 provides additional stiffness and flexural rigidity to the glass article 32, which enhances performance in headform impact testing as discussed below. In embodiments, the support member 58 comprises a sheet of metal (e.g., steel or aluminum alloy), composite material (e.g., fiber-reinforced plastic), or plastic. In embodiments, the support member 58 may be selected based on a desired stiffness or flexural rigidity, considering the geometry (e.g., shape, thickness, etc.) and material properties (such as Young's modulus and Poisson's ratio) of the support member 58.

Further, in embodiments, the support member 58 provides a mounting mechanism for the fixed, second side 36 of the glass article 32. In particular, the support member 58 may include a plurality of posts 60 or studs configured to engage a vehicle interior base, such as a base of the dashboard 12 shown in FIG. 1. With respect to the embodiment shown in FIG. 5, the posts 60 extend from the support member 58 in a direction opposite to the glass sheet 42. As will be discussed below, the support member 58 can be integrated into the glass article 32 through the molding process using the encapsulating material 52. On the first side 34 of the glass article 32, the posts 60 may provide a mated interaction with the dashboard base 12 to hold the glass article 32 in the bent configuration (i.e., so that the first side 34 does not vibrate under typical driving conditions). Further, the posts 60 may provide an attachment point for the electro-mechanical actuation mechanism mentioned above to position the first side 34 between the planar and bent configurations.

FIG. 6 depicts another embodiment of the glass article 32 that is substantially similar to the embodiment of FIG. 5 except that the embodiment of FIG. 6 further includes a display module 62. In embodiments, the display module 62 is positioned within a void 64 formed in the encapsulating material 52. Further, in embodiments also including a support member 58, the support member 58 may include an aperture through which the display module 62 is inserted. In embodiments, the display module 62 includes a display unit and a backlight unit. In embodiments, the display module 62 is at least one of a light emitting diode (LED) display, a micro-LED display, an organic LED (OLED) display, a liquid crystal display (LCD), or plasma display. The display module 62 is disposed on the second major surface 46 of the glass sheet 42, and the display module 62 may be bonded to the second major surface 46 of the glass sheet 42 using an optically clear adhesive. With reference to both FIGS. 2 and 6, a display module 62 can be provided for each display screen 24, 26, 30 of the glass article 32. Further, in embodiments, any of the display modules 62 provide for any of the display screens 24, 26, 30 may be provided with touch functionality for user interaction.

Having described various embodiments of the glass article 32, a method of forming the glass article 32 is now described. In embodiments, the encapsulating material 52 is molded onto the glass sheet 42 by an injection molding process. For example, the glass article 32 is formed by arranging the glass sheet 42 in a mold (e.g., a clam shell mold) and positioning the hinge 50 and support member 58 (if included) within the mold. Additionally, if a display module 62 is to be included in the glass article 32, the mold may be shaped to create a void where the display module 62 is to be positioned, or a removable molding block may be arranged to create a void 64 where the display module 62 is to be positioned. Thereafter, the encapsulating material 52 is injected into the mold so as to cover the second major surface 46 and minor surface 48 as desired. Additionally, the encapsulating material 52 bonds to the glass sheet 42, hinge 50, and support member 58 without the need for additional adhesives. Thus, the encapsulating material 52 also joins the glass sheet 42, the hinge 50, and the support member 58 into an integral glass article 32. In embodiments, a primer may be applied to the glass sheet 52, the hinge 50, and/or the support member 58 to facilitate bonding with the encapsulating material 52.

The curvatures 38*a*-*c* of the glass article 32, particularly on the second side 36, can be produced by either hot-forming or cold-forming. By "cold-forming," it is meant that the curvatures 38 are introduced to the glass sheet 42 at a temperature below the softening temperature of the glass. More particularly, cold-forming takes place at below 200° C., below 100° C., or even at room temperature. "Hot-forming" by contrast, takes place at temperatures at or above the softening temperature of the glass sheet 42, using presses, sagging apparatuses, forming lehrs, etc. A further distinguishing feature between hot-forming and cold-forming is that the curvatures 38 introduced by hot-forming are permanent in that the glass sheet 42 will retain the curvatures until re-formed at a temperature at or above the softening temperature.

Curvatures introduced by cold-forming are not permanent. In particular, during cold forming, pressure is applied to the glass sheet 42 to bring the glass sheet 42 into conformity with a desired shape. Pressure may be applied in a variety of different ways, such as vacuum pressure, a mechanical press, rollers, etc. The glass sheet 42 is then bonded to a support structure (e.g., support member 58) to retain the glass sheet 42 in its cold-formed shape. However, if debonded from the support structure, the glass sheet 42 will spring back to its planar configuration. This property is exploited for the fourth curvature 38*d* shown in FIG. 2, and by using the hinge 50, the glass sheet 42 is allowed to bend between the planar configuration (oriented towards the driver side 20) and the bent configuration (oriented between the driver side 20 and the passenger side 22). However, the other curvatures 38*a*-*c*, being on the fixed, second side 36, would be retained in their cold-formed position.

In embodiments, the glass sheet 42 is hot-formed to introduce desired curvatures 38*a*-*c* prior to injection molding with the encapsulating material 52. In other embodiments, the glass sheet 42 is cold-formed prior to injection molding with the encapsulating material 52 to introduce desired curvatures 38. In still other embodiments, the glass sheet 42 is cold-formed during injection molding with the encapsulating material 52 to introduce desired curvatures 38.

Advantageously, the glass articles 32 described herein are configured to pass head impact testing (HIT) requirements. During HIT, interior surfaces of a vehicle are investigated to determine whether vehicle interior systems meet relevant head injury criterion (HIC) based on simulated head impact with the vehicle interior system during a crash. In particular, a headform simulating a human head is used to determine the deceleration characteristics of an impact with the tested vehicle interior system. Successful test performance is achieved by reducing both the magnitude of deceleration and the time over which it occurs. As defined in US DOT FMVSS 201, the headform should not exceed 80 g for more than 3 ms when the headform impacts at a speed of 15 mph. Additionally, it is desired that the glass sheet 42 remain intact after HIT so that sharp glass fragments are not produced, which may also contribute to injury.

As mentioned, the HIT performance of the disclosed glass article 32 can be manipulated by incorporation of the support member 58. Specifically, the support member 58 can be tailored to provide a degree of stiffness and flexural rigidity that is not so high as to create too large of a magnitude of deceleration and not so low as to create a large deflection of the glass sheet, contributing to fracture of the glass sheet 42. These considerations are relevant to any glass surface in a vehicle interior, and the presently disclosed glass article 32 presents the additional issue of accounting for the dynamic motion of the glass article 32 based on the ability of the first side 34 to bend relative to the second side 36. Specifically, when the first side 34 is oriented towards the driver side 20, the free end 54 is only supported in its position by the hinge 50, and the edge of the glass sheet 42 has a higher potential as a failure point. However, according to the present disclosure, the edge is protected by the encapsulating material on the second major surface 46 and on the minor surface 48. Accordingly, the glass article 32 can be configured to provide the stiffness and flexural rigidity necessary to pass HIT based, at least in part, on selection of an appropriate support member 58, and the edge and surfaces of the glass sheet 42 are protected by the encapsulating material 52.

Other advantages of the presently disclosed glass article 32 and method of forming the glass article 32 include reduced weight in the overall design, structural integration of the hinge 50 into the glass article 32, simplified assembly (e.g., through an injection molding process, and reduced thermal mismatches between components of the glass article 32.

In the following paragraphs and with reference to FIGS. 1-3, various geometrical properties of the glass sheet 42 as well as compositions of the glass sheet are provided. As mentioned above, the glass sheet 42 has a thickness T that is substantially constant and is defined as a distance between the first major surface 44 and the second major surface 46. In various embodiments, T is from 0.3 mm to 2.0 mm. In addition, the glass sheet 42 includes a width W2 defined as a first maximum dimension of one of the first or second major surfaces 44, 46 orthogonal to the thickness T, and a length L2 defined as a second maximum dimension of one of the first or second major surfaces 44, 46 orthogonal to both the thickness and the width. In other embodiments, width W2 and length L2 may be the average width and the average length of the glass sheet 42, respectively, and in other embodiments, width W2 and length L2 may be the maximum width and the maximum length of the glass sheet 42, respectively (e.g., for glass sheets 42 having a variable width or length). In various embodiments, width W2 is in a range from 5 cm to 250 cm, and length L2 is in a range from about 5 cm to about 1500 cm. Further, in various embodiments, the curvatures 38a-d of the glass article 32 may have each have a radius of curvature in a range from about 20 mm to about 10,000 mm.

Further, the various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

In embodiments, the glass sheet 42 may be strengthened. In one or more embodiments, glass sheet 42 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 42 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 42 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheets may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T of the glass sheet 42 (as described herein). For example, in one or more embodiments, the DOC may be equal to or greater than about 0.05 T to about 0.25 T. In some instances, the DOC may be about 20 µm to about 300 µm. Further, in one or more embodiments, the strengthened glass sheet may have a CS (which may be found at the surface or a depth within the glass sheet) of about 200 MPa or greater, about 500 MPa or greater, or about 1000 MPa or greater. In one or more embodiments, the strengthened glass sheet may have a maximum tensile stress or central tension (CT) of about 20 MPa or greater, about 50 MPa or greater, or about 85 MPa or greater.

Suitable glass compositions for use in glass sheet 42 include soda lime glass, aluminosilicate glass, borosilicate glass, boroaluminosilicate glass, alkali-containing aluminosilicate glass, alkali-containing borosilicate glass, and alkali-containing boroaluminosilicate glass.

In one or more embodiments, the glass composition may include $SiO_2$ in an amount in a range from about 66 mol % to about 80 mol %, $Al_2O_3$ in an amount in a range from about 4 mol % to about 15 mol %, $B_2O_3$ in an amount in a range from about 0 mol % to about 5 mol %, $P_2O_5$ in an amount in a range from about 0 mol % to about 2 mol %, $R_2O$ in an amount in a range from about 8 mol % to about 20 mol %, RO in an amount in a range of from about 0 mol % to about 2 mol %, $ZrO_2$ in an amount in a range of from about 0 mol % to about 0.2 mol %, and $SnO_2$ in an amount in a range from about 0 mol % to about 0.2 mol %. In the foregoing composition, $R_2O$ refers to the total amount of alkali metal oxides, such as $Li_2O$, $Na_2O$, $K_2O$, $Rb_2O$, and $Cs_2O$). In particular, $Na_2O$ may be present in an amount in a range from about from about 8 mol % to about 20 mol %, and $K_2O$ may be present in an amount in a range from about 0 mol % to about 4 mol %. Further, in the foregoing composition, RO refers to the total amount of alkaline earth metal oxide such, as CaO, MgO, BaO, ZnO and SrO. In particular, CaO may be present in an amount in a range of from about 0 mol % to about 1 mol %, and MgO may be present in an amount in a range of from about 0 mol % to about 7 mol %.

In embodiments, the glass composition may include other oxides of such metals as Ti, V, Cr, Mn, Fe, Co, Ni, Cu, Ce, W, and Mo. In particular, Fe in the form of $Fe_2O_3$ may be present in an amount in a range of from about 0 mol % to about 1 mol %, and $TiO_2$ may be present in an amount of in a range of about 0 mol % to about 5 mol %.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Aspect (1) of this disclosure pertains to a glass article for a vehicle interior system, comprising: a glass sheet having a first major surface, a second major surface opposite to the first major surface, and a minor surface connecting the first major surface and the second major surface, wherein the glass sheet comprises a first side and a second side; at least one hinge disposed on the second major surface of the glass sheet, the at least one hinge dividing the glass sheet between the first side and the second side; an encapsulating material molded at least partially around the minor surface and at least partially over the second major surface; wherein the second side of the glass sheet rotates about the at least one hinge from a first configuration to a second configuration; wherein, in the first configuration, the first side forms a first angle with the second side and, in the second configuration, the first side forms a second angle with the second side, the first angle being different from the second angle.

Aspect (2) of this disclosure pertains to the glass article of Aspect (1), wherein each of the at least one hinge comprises at least one of a living hinge, a mandrel hinge, a flexure hinge, a lattice hinge, or a links hinge.

Aspect (3) of this disclosure pertains to the glass article of Aspect (1) or Aspect (2), wherein the encapsulating material comprises polyurethane, polyvinylchloride, or a reaction injection molding material.

Aspect (4) of this disclosure pertains to the glass article of any one of Aspects (1) through (3), wherein the first angle in the first configuration is 180° such that the first side and the second side are substantially planar.

Aspect (5) of this disclosure pertains to the glass article of any one of Aspects (1) through (4), wherein the second angle in the second configuration is from 190° to 290°.

Aspect (6) of this disclosure pertains to the glass article of any one of Aspects (1) through (5), further comprising a support member embedded in the encapsulating material such that the encapsulating material is disposed between the glass sheet and the support member.

Aspect (7) of this disclosure pertains to the glass article of Aspect (6), wherein the support member comprises a metal sheet, a composite sheet, or a plastic sheet.

Aspect (8) of this disclosure pertains to the glass article of Aspect (6) or Aspect (7), wherein the support member further comprises a mounting mechanism configured to connect the glass article to a vehicle interior base.

Aspect (9) of this disclosure pertains to the glass article of any one of Aspects (1) through (8), further comprising a display module adhered to the second major surface of the glass sheet, wherein the encapsulating material comprises a void adapted to receive the display module.

Aspect (10) of this disclosure pertains to the glass article of any one of Aspects (1) through (9), wherein, when subjected to headform impact testing according to US DOT FMVSS 201, a headform impacting the glass sheet does not experience a force of 80 g for more than 3 ms during deceleration.

Aspect (11) of this disclosure pertains to an interior system of a vehicle, comprising: a dashboard base positioned across a center line axis of the vehicle, the center line axis dividing the vehicle longitudinally into a driver side and a passenger side; a glass article attached to the dashboard base, the glass article comprising: a glass sheet comprising a first major surface, a second major surface opposite to the first major surface, and a minor surface connecting the first major surface and the second major surface, wherein the first glass sheet comprises a first side and a second side, the first side being located on the driver side of the center line axis; at least one hinge disposed on the second major surface of the glass sheet, the at least one hinge dividing the glass sheet between the first side and the second side; and an encapsulating material molded at least partially around the minor surface and at least partially over the second major surface; wherein the second side of the glass sheet rotates about the hinge from a first configuration to a second configuration; wherein, in the first configuration, the first side of the glass sheet comprises a first portion on the driver side and a second portion on the passenger side; and wherein, in the second configuration, the first portion of the first side of the glass sheet is increased relative to the first configuration and the second portion of the first side of the glass sheet is decreased relative to the first configuration.

Aspect (12) of this disclosure pertains to the interior system of Aspect (11), wherein the glass article further comprises a display on the second side of the glass article.

Aspect (13) of this disclosure pertains to the interior system of Aspect (11) or Aspect (12), wherein the first side comprises at least one curvature.

Aspect (14) of this disclosure pertains to the interior system of any one of Aspects (11) through (13), wherein, when subjected to headform impact testing according to US DOT FMVSS 201, a headform impacting the glass sheet does not experience a force of 80 g for more than 3 ms during deceleration.

Aspect (15) of this disclosure pertains to the interior system of any one of Aspects (11) through (14), wherein each of the at least one hinge comprises at least one of a living hinge, a mandrel hinge, a flexure hinge, a lattice hinge, or a links hinge.

Aspect (16) of this disclosure pertains to the interior system of any one of Aspects (11) through (15), wherein the encapsulating material comprises polyurethane, polyvinylchloride, or a reaction injection molding material.

Aspect (17) of this disclosure pertains to the interior system of any one of Aspects (11) through (16), further comprising a support member embedded in the encapsulating material such that the encapsulating material is disposed between the glass sheet and the support member.

Aspect (18) of this disclosure pertains to the interior system of Aspect (17), wherein the support member is a metal sheet, a composite sheet, or a plastic sheet.

Aspect (19) of this disclosure pertains to the interior system of Aspect (17) or Aspect (18), wherein the support member further comprises an attachment mechanism configured to connect the glass article to a dashboard base.

Aspect (20) of this disclosure pertains to the interior system of any one of Aspects (11) through (19), wherein the encapsulating material comprises a void into which a display module is inserted.

Aspect (21) of this disclosure pertains to a method of forming a glass article, comprising: arranging a glass sheet in a mold, the glass sheet comprising a first major surface, a second major surface opposite the first major surface, and a minor surface connecting the first major surface and the second major surface; positioning at least one hinge on the second major surface of the glass sheet in the mold; injecting an encapsulating material into the mold so that the encapsulating material at least partially surrounds the minor surface and at least partially covers the second major surface of the glass sheet; wherein the glass article is configured to bend about the at least one hinge from a first configuration to a second configuration; and wherein, in the first configuration, the first side forms a first angle with the second side and, in the second configuration, the first side forms a second angle with the second side, the first angle being different from the second angle.

Aspect (22) of this disclosure pertains to the method of Aspect (21), further comprising the step of positioning a support member within the mold, wherein the encapsulating material is injected between the glass sheet and the support member.

Aspect (23) of this disclosure pertains to the method of Aspect (22), wherein the support member comprises a metal sheet, a composite sheet, or a plastic sheet.

Aspect (24) of this disclosure pertains to the method of Aspect (22) or Aspect (23), wherein the support member further comprises an attachment mechanism configured to connect the glass article to a vehicle interior base.

Aspect (25) of this disclosure pertains to the method of any one of Aspects (21) through (24), further comprising the step of forming a void in the encapsulating material configured to receive a display module.

Aspect (26) of this disclosure pertains to the method of Aspect (25), further comprising the step of adhering the display module to the second major surface of the glass sheet.

Aspect (27) of this disclosure pertains to the method of any one of Aspects (21) through (26), wherein the encapsulating material comprises polyurethane, polyvinylchloride, or a reaction injection molding material.

Aspect (28) of this disclosure pertains to the method of any one of Aspects (21) through (27), wherein the first angle in the first configuration is 180° such that the first side and the second side are substantially planar.

Aspect (29) of this disclosure pertains to the method of any one of Aspects (21) through (28), wherein the second angle in the second configuration is from 190° to 290°.

Aspect (30) of this disclosure pertains to the method of any one of Aspects (21) through (29), wherein each of the at least one hinge comprises at least one of a living hinge, a mandrel hinge, a flexure hinge, a lattice hinge, or a links hinge.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article for a vehicle interior system, comprising:
    a glass sheet having a first major surface, a second major surface opposite to the first major surface, and a minor surface connecting the first major surface and the second major surface, wherein the glass sheet comprises a first side and a second side;
at least one hinge disposed on the second major surface of the glass sheet, the at least one hinge dividing the glass sheet between the first side and the second side;
an encapsulating material molded at least partially onto the minor surface and at least partially over the second major surface;
wherein the second side of the glass sheet rotates about the at least one hinge from a first configuration to a second configuration;
wherein, in the first configuration, the first side forms a first angle with the second side and, in the second configuration, the first side forms a second angle with the second side, the first angle being different from the second angle.

2. The glass article of claim 1, wherein each of the at least one hinge comprises at least one of a living hinge, a mandrel hinge, a flexure hinge, a lattice hinge, or a links hinge.

3. The glass article of claim 1, wherein the encapsulating material comprises polyurethane, polyvinylchloride, or a reaction injection molding material.

4. The glass article of claim 1, wherein the first angle in the first configuration is 180° such that the first side and the second side are substantially planar, wherein the second angle in the second configuration is from 190° to 290°.

5. The glass article of claim 1, further comprising a support member embedded in the encapsulating material such that the encapsulating material is disposed between the glass sheet and the support member, wherein the support member comprises a metal sheet, a composite sheet, or a plastic sheet.

6. The glass article of claim 5, wherein the support member further comprises a mounting mechanism configured to connect the glass article to a vehicle interior base, the mounting mechanism having a shape configured to one or more of (i) engage the vehicle interior base and (ii) provide a mated interaction with the vehicle interior base.

7. The glass article of claim 1, further comprising a display module adhered to the second major surface of the glass sheet, wherein the encapsulating material comprises a void adapted to receive the display module.

8. The glass article of claim 1, wherein, when subjected to headform impact testing according to US DOT FMVSS 201, a headform impacting the glass sheet does not experience a force of 80 g for more than 3 ms during deceleration.

9. An interior system of a vehicle, comprising:
a dashboard base positioned across a center line axis of the vehicle, the center line axis dividing the vehicle longitudinally into a driver side and a passenger side;
a glass article attached to the dashboard base, the glass article comprising:
a glass sheet comprising a first major surface, a second major surface opposite to the first major surface, and a minor surface connecting the first major surface and the second major surface, wherein the first glass sheet comprises a first side and a second side, the first side being located on the driver side of the center line axis;
at least one hinge disposed on the second major surface of the glass sheet, the at least one hinge dividing the glass sheet between the first side and the second side; and
an encapsulating material molded at least partially around the minor surface and at least partially over the second major surface;
wherein the second side of the glass sheet rotates about the hinge from a first configuration to a second configuration;
wherein, in the first configuration, the first side of the glass sheet comprises a first portion on the driver side and a second portion on the passenger side; and
wherein, in the second configuration, the first portion of the first side of the glass sheet is increased relative to the first configuration and the second portion of the first side of the glass sheet is decreased relative to the first configuration.

10. The interior system of claim 9, wherein, when subjected to headform impact testing according to US DOT FMVSS 201, a headform impacting the glass sheet does not experience a force of 80 g for more than 3 ms during deceleration.

11. The interior system of claim 9, wherein each of the at least one hinge comprises at least one of a living hinge, a mandrel hinge, a flexure hinge, a lattice hinge, or a links hinge.

12. The interior system of claim 9, wherein the encapsulating material comprises polyurethane, polyvinylchloride, or a reaction injection molding material.

13. The interior system of claim 9, further comprising a support member embedded in the encapsulating material such that the encapsulating material is disposed between the glass sheet and the support member, wherein the support member is a metal sheet, a composite sheet, or a plastic sheet.

14. The interior system of claim 13, wherein the support member further comprises an attachment mechanism configured to connect the glass article to a dashboard base, the attachment mechanism having a shape configured to one or more of (i) engage the dashboard base and (ii) provide a mated interaction with the dashboard base.

15. The interior system of claim 9, wherein the encapsulating material comprises a void into which a display module is inserted.

16. A method of forming a glass article, comprising:
arranging a glass sheet in a mold, the glass sheet comprising a first major surface, a second major surface opposite the first major surface, and a minor surface connecting the first major surface and the second major surface;
positioning at least one hinge on the second major surface of the glass sheet in the mold;
injecting an encapsulating material into the mold so that the encapsulating material at least partially surrounds the minor surface and at least partially covers the second major surface of the glass sheet;
wherein the glass article is configured to bend about the at least one hinge from a first configuration to a second configuration; and
wherein, in the first configuration, the first side forms a first angle with the second side and, in the second configuration, the first side forms a second angle with the second side, the first angle being different from the second angle.

17. The method of claim 16, further comprising the step of positioning a support member within the mold, wherein the encapsulating material is injected between the glass sheet and the support member.

18. The method of claim 16, further comprising the step of forming a void in the encapsulating material configured to receive a display module.

19. The method of claim 18, further comprising the step of adhering the display module to the second major surface of the glass sheet.

20. The glass article of claim 1, wherein the encapsulating material is molded onto the minor surface about an entire periphery of the glass sheet.

* * * * *